US008644246B2

(12) United States Patent
Sebire

(10) Patent No.: US 8,644,246 B2
(45) Date of Patent: Feb. 4, 2014

(54) SCHEDULING INFORMATION AT SERVING CELL CHANGE

(75) Inventor: Benoist Sebire, Beijing (CN)

(73) Assignee: Nokia Corporation, Espoo (FI)

( * ) Notice: Subject to any disclaimer, the term of this patent is extended or adjusted under 35 U.S.C. 154(b) by 1824 days.

(21) Appl. No.: 11/431,023

(22) Filed: May 10, 2006

(65) Prior Publication Data

US 2007/0010281 A1 Jan. 11, 2007

Related U.S. Application Data

(60) Provisional application No. 60/695,873, filed on Jul. 5, 2005.

(51) Int. Cl.
*H04W 4/00* (2009.01)

(52) U.S. Cl.
USPC ............ 370/331; 455/436; 455/437; 455/438

(58) Field of Classification Search
USPC ................. 370/310, 331, 395.4, 332, 333; 455/436–444, 450
See application file for complete search history.

(56) References Cited

U.S. PATENT DOCUMENTS

| 7,158,504 | B2 | 1/2007 | Kadaba et al. | |
|---|---|---|---|---|
| 2002/0172217 | A1 | 11/2002 | Kadaba | |
| 2005/0249187 | A1* | 11/2005 | Cho et al. | 370/349 |
| 2006/0280145 | A1* | 12/2006 | Revel et al. | 370/331 |

FOREIGN PATENT DOCUMENTS

| CN | 101194476 A | 6/2008 |
|---|---|---|
| EP | 1447938 | 8/2004 |
| EP | 1708523 | 10/2006 |
| JP | 2002-369261 | 12/2002 |
| JP | 2002 369261 A | 12/2002 |
| KR | 20040074015 A | 8/2004 |
| WO | 2005018496 | 3/2005 |
| WO | WO 2005/125253 | 12/2005 |
| WO | WO 2006/077141 | 7/2006 |
| WO | WO 2006/081874 | 8/2006 |
| WO | WO 2006/085167 | 8/2006 |

OTHER PUBLICATIONS

3GPP TS 25.309 V6.2.0, $3^{rd}$ Generation Partnership Project; Technical Specification Group Radio Access Network; FDD Enhanced Uplink;Overall description; Stage 2 (release 6), published Mar. 2005.*
International Search Report for International Application No. PCT/IB2006/001305, filed May 18, 2006.
Russian Office Action dated May 4, 2009.
Chinese first Office Action dated Aug. 3, 2010.

(Continued)

*Primary Examiner* — Ajit Patel
(74) *Attorney, Agent, or Firm* — Squire Sanders (US) LLP

(57) ABSTRACT

The invention provides, according to one aspect, a method of scheduling information in a communication system at serving cell change. When a serving cell changes for a user equipment (UE), it is determined whether the new serving cell belonged to the previous serving enhanced data channel (EDCH) radio link set (RLS). The user equipment then sends scheduling information (SI) in the first MAC-e protocol data unit (PDU) sent in uplink after completion of the serving cell change only when it is determined that the new serving cell did not belong to the previous serving EDCH RLS. In other words, the UE sends the SI at serving cell change only when the base station (node B) has also changed.

14 Claims, 3 Drawing Sheets

(56) References Cited

OTHER PUBLICATIONS

Japanese Office Action dated May 20, 2010.
Korean Office Action, dated Aug. 10, 2012; Issued on Application No. 2008-7001601.
Chinese Office Action, dated Aug. 28, 2012; Issued on corresponding Application No. 200680022827.6.
Supplemental European Search Report in European Application No. 06744726.8-1249, dated Apr. 11, 2012.
QUALCOMM, SI Transmission Triggering Schemes, 3GPP TSG-RAN WG2 meeting #46bis, Apr. 4-8, 2005, Beijing, China.
3RD Generation Partnership Project: Technical Specification Group Radio Access Network; FDD Enhanced Uplink; Overall Description; Stage 2 (Release 6); 3GPP TS 25.309 V6.32.0 (2005-063).
SAMSUNG, Non-Serving RLS E-RGCH Handling, 3GPP TSG RAN2#47, Athens, Greese, May 9-13, 2005.

* cited by examiner

SCHEDULING INFORMATION AT SERVING CELL CHANGE

CROSS REFERENCE TO RELATED APPLICATIONS

This application claims the benefit of U.S. Provisional Application Ser. No. 60/695,873 filed on Jul. 5, 2005. The information contained in the provisional application is hereby incorporated by reference.

BACKGROUND OF THE INVENTION

1. Field of the Invention

The present invention relates to wireless communication and particularly to a method and system for improving the performance of uplink dedicated transport channels. More specifically, the invention relates to a method and system for sending Scheduling Information (SI) when a serving cell changes.

2. Description of the Related Art

A communication system may simply be considered a facility which enables communication between two or more entities such as user equipment (UE) and/or other nodes associated with the system. The communication may include, for example, communication of voice, data, multimedia, etc. The communication system may be circuit switched or packet switched. Additionally, the communication system may be configured to provide wireless communication. Communication systems able to support mobility of communications devices across a large geographic area are generally called mobile or cellular communications system. In cellular communication systems, a communications device or user equipment typically changes the cell via which it communicates as the user changes locations. Some examples of a cellular communications system are the Global System for Mobile Telecommunications (GSM) and the Universal Mobile Telecommunications System (UMTS).

Communication systems and networks, such as the mobile telephone or cellular systems discussed above, have greatly expanded and are in widespread use as the communication device of choice. The popularity of mobile or cellular communication devices is due in part to the mobility that it provides users to travel from area-to-area while maintaining the ability to receive service and communicate with other users. These mobile communication devices generally establish end-to-end communication through a network. Unlike hardwired "land" communications, mobile telecommunication devices or user equipment (UE), such as cellular telephones, must establish a connection to a serving controller coupled to a network to carry communication data. Accordingly, a procedure is carried out between the UE and the network via the serving controller to establish a connection to the network. The procedures, features, and advantages of mobile or cellular-type communications and devices are well known.

SUMMARY OF THE INVENTION

The present invention provides, according to one embodiment, a method of scheduling information in a communication system at serving cell change. The method includes the steps of informing a user equipment (UE) when a serving cell has changed to a new serving cell, and sending, from the UE, scheduling information (SI) when the UE is informed that the serving cell has changed.

According to another aspect of the invention, a communications system is provided. The communications system includes a user equipment, a base station, and a network node configured to inform the user equipment of a change in a serving cell. The user equipment may be configured to send scheduling information to the base station when the serving cell has changed.

According to another embodiment of the invention, a method of scheduling information in a communication system at serving cell change is provided. The method includes informing a user equipment (UE) when a serving cell has changed to a new serving cell and determining, at the UE, whether the new serving cell belonged to a previous serving radio link set. The method further includes sending, from the UE, scheduling information (SI) when it is determined that the new serving cell did not belong to the previous serving radio link set. The previous serving radio link set may be an enhanced dedicated transport channel (EDCH) radio link set (RLS). Additionally, the step of sending may include sending the scheduling information (SI) in a first medium access control (MAC) protocol data unit (PDU) sent in uplink after completion of the serving cell change.

The invention also provides, according to one embodiment, a communications system. The communications system includes a user equipment, a base station, and a network node configured to inform the user equipment of a change in a serving cell. The user equipment is configured to determine whether a new serving cell belonged to a previous serving radio link set. The user equipment may be further configured to send scheduling information to the base station when it is determined that the new serving cell did not belong to the previous serving radio link set.

According to another embodiment of the invention, a method of scheduling information in a communication system at serving cell change is provided. The method includes informing means for informing a user equipment (UE) when a serving cell has changed to a new serving cell, determining means for determining, at the UE, whether the new serving cell belonged to a previous serving radio link set, and sending means for sending, from the UE, scheduling information (SI) when it is determined that the new serving cell did not belong to the previous serving radio link set.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
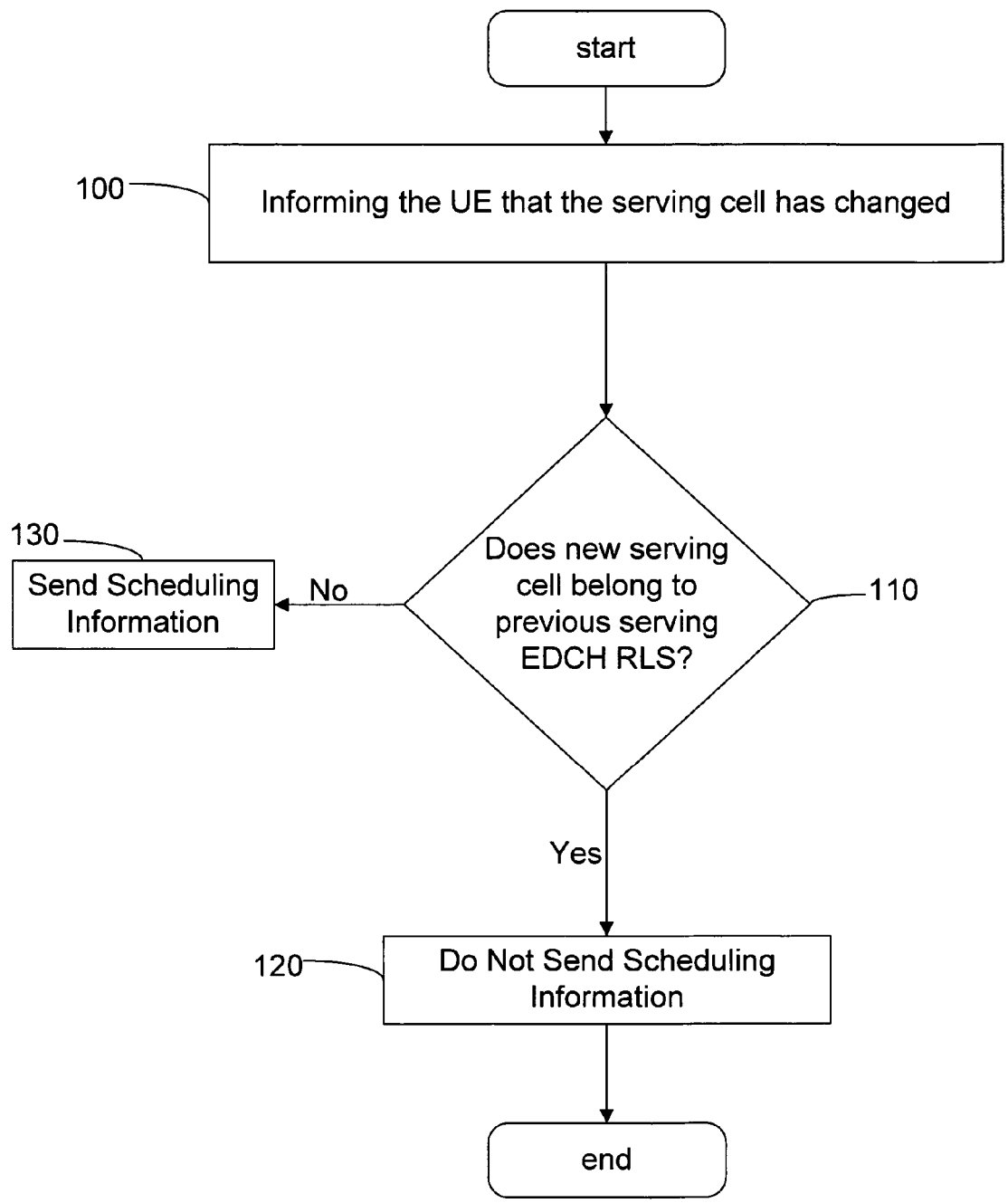
FIG. 1 illustrates a method according to one embodiment of the invention.

One example of the communications systems outline above is the universal mobile telecommunications system (UMTS). The UMTS terrestrial radio access network (UTRAN) is provided with a radio interface protocol architecture. Specifically, the radio interface is layered into three protocol layers: the physical layer (L1), the data link layer (L2), and the network layer (L3). L2 is divided into the medium access control (MAC) sublayer, the radio link control (RLC) sublayer, the packet data convergence protocol (PDCP) sublayer, and the broadcast/multicast control (BMC) sublayer. L3 and RLC are divided into control (C-) and User (U-) planes. In the C-plane, L3 is partitioned into sublayers where the lowest, denoted as radio resource control (RRC), interfaces with L2 and terminates in the UTRAN. The MAC sublayer is made up of several different MAC entities, such as MAC-d, MAC-c/sh/m, MAC-hs, MAC-es/MAC-e, and MAC-m. The MAC-es/MAC-e entities provide hybrid automatic repeat request (HARQ) functionality and are only used with enhanced dedicated transport channels (EDCH).

In certain mobile communication systems, high speed data transmission may be enabled, for example, by means of high speed downlink packet access (HSDPA) or high speed uplink packet access (HSUPA) technology. The HSDPA/HSUPA may include functions such as fast hybrid automatic repeat request (HARQ), adaptive coding and modulation (AMC), and fast cell selection (FCS). These functions are known by the skilled person and therefore will not be discussed in further detail.

In HSDPA, each UE receiving data on a high speed downlink shared channel (HS-DSCH) also has an associated dedicated channel (DCH) allocated. The dedicated channel may be mapped to a dedicated physical channel (DPCH) in the physical layer. The DPCH is typically divided into dedicated physical data channel (DPDCH) and dedicated physical control channel (DPCCH) both in the uplink and the downlink. Data such as the power control commands, transport format information, and dedicated pilot symbols are transmitted on the DPCCH. Information such as diversity feedback information may also be transmitted on DPCCH in the uplink. The HS-DSCH may be mapped to one or several high speed physical downlink shared channels (HS-PDSCH) in the physical layer. The associated dedicated channel is typically provided both in the downlink and the uplink. The dedicated channel is typically used to carry HSDPA related information/signaling as well as other dedicated data such as speech and control data. The user equipment may communicate with several base stations at the same time. For example, the associated dedicated channel may be in soft handover.

In addition to associated dedicated channels, the HS-DSCH may be associated with a shared control channel (SCCH). The SCCH may be used to carry HS-DSCH specific information/signaling to those users receiving data on the HS-DSCH.

HSUPA is a data access protocol developed to enable the uplink from the mobile device or user equipment (UE) to the base station (Node B) to be able to handle data at high speeds, similar to those of HSDPA. For most applications, such as e-mail and video downloads, data flows in the downlink direction at a much greater rate than that of the uplink. However, certain applications, such as video conferencing, require data to flow at a high speed in both the uplink and downlink directions. Therefore, in order to provide high quality services, the HSUPA technology is being developed to ensure that the uplink performs at high speeds that are similar to those of the downlink. HSUPA utilizes enhanced uplink dedicated transport channels (EDCH), which are channels that provide increased capacity and throughput while reducing delay thereby resulting in an improved experience for users of mobile terminals. Since coverage is an important aspect of the user experience, it is desirable to allow an operator to provide consistency of performance across a whole cell area.

According to prior art solutions, a packet scheduler is located in the radio network controller (RNC) and therefore is limited in its ability to adapt to the instantaneous traffic because of bandwidth constraints on the radio resource controller (RRC) signaling between the RNC and the user equipment (UE). Therefore, in order to accommodate the variability, the packet scheduler must be conservative in allocating uplink power to take into account the influence from inactive users in the following scheduling period. Such a solution is inefficient for high allocated data rates and long release timer values. As such, there is a need for improved performance of uplink dedicated transport channels.

Similar to HSDPA, HSUPA includes a packet scheduler, but it operates on a request-grant principle where the UEs request a permission to send data and the scheduler decides when and how many UEs will be allowed to do so. A request for transmission may contain data about the state of the transmission buffer and the queue at the UE and its available power margin. Two basic scheduling methods may be available in HSUPA. Long term grants are issued to several terminals which can then send their data simultaneously. The grants are increased or decreased according to the current load of the cell and the requirements of the terminals. Short term grants, on the other hand, are an alternative scheduling method to allow multiplexing terminals in the time domain as opposed to the code domain. In order to allow multiplexing uplink transmissions of several terminals in both code and time domain, the scrambling and channelization codes are not shared between different terminals as is done in HSDPA on a shared downlink channel.

Accordingly, the present invention is directed, in one embodiment, to enhancement of the uplink DCH (EDCH) for packet data traffic in release 6 of the 3GPP. Enhancements may be achieved by distributing some of the packet scheduler functionality to the Node Bs to have faster scheduling of bursty non real-time traffic than the layer 3 in RNC facilitates. Node B may be considered a logical node responsible for radio transmission or reception in one or more cells to or from the user equipment (UE). With faster link adaptation it is possible to more efficiently share the uplink power resource between packet data users. When packets have been transmitted from one user, the scheduled resource can be made available immediately to another user. Such a solution avoids the peaked variability of noise rise when high data rates are being allocated to users running bursty high data-rate applications.

According to an embodiment of the invention, much of the packet scheduler functionality is transferred to the Node B by utilizing EDCH. In other words, there is a Node B scheduler that provides for allocating uplink resources. The Node B scheduler is responsible for allocating uplink resources to UEs for which it acts as the serving Node B, as well as monitoring other-cell interference and sending relative grants (discussed below) to UEs for which it does not act as the serving Node B and reporting to the serving radio network controller (SRNC) on the lack of processing resources.

For transmission of data, the UE selects a transport format combination (TFC) that suits the amount of data to be transmitted in its radio link control (RLC) buffer, subject to constraints on the maximum transmission power of the UE and the maximum power allowed by the scheduler. If required, the UE may request more resources by sending Rate Request (RR) messages in the uplink and the Node B may decide whether to grant additional resources by answering with rate grant messages in the downlink. For efficient Node B scheduling, some information may be required from the UE. For example, buffer status, power status, priority information regarding the MAC-d flows or logical channels that are being used are all pieces of information that may need to be provided by the UE. This information is referred to as Scheduling Information (SI).

Figure 2:
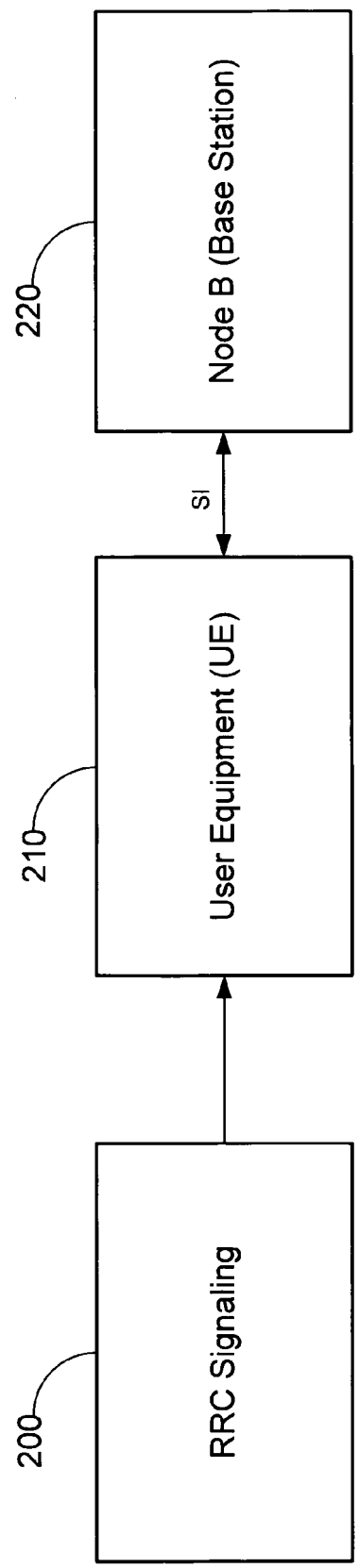
FIG. 2 illustrates a system according to one embodiment of the invention.

According to another aspect of the present invention, a method and system for determining what will be done with the SI when the serving cell changes are provided. An example of a method, according to one aspect of the invention, is illustrated in FIG. 1. While an example of the system, according to another aspect of the invention, is illustrated in FIG. 2. In one embodiment, the SI is sent, at serving cell change, when the new serving cell did not belong to the serving EDCH RLS (i.e. a set of cells containing the serving cell and under the control of the same Node B). In other words, the UE sends the SI at serving cell change only if the Node B has also changed. When the UE is informed by the radio resource control (RRC) signaling that the serving cell has changed, it checks if the new serving cell belonged to the previous serving EDCH RLS. If it did not belong to the previous serving EDCH RLS, then the UE includes a scheduling information in the first MAC-e PDU it sends in uplink after the serving cell change is completed. In this manner, the new serving Node B can receive scheduling information which is up to date.

Specifically, FIG. 1 demonstrates that the UE is first informed that the serving cell has changed 100. The UE may be notified of the serving cell change by the RRC signaling, for example. Next, the UE determines whether the new serving cell belonged to the previous serving EDCH RLS 110. If the new serving cell does indeed belong to the previous serving EDCH RLS, then the UE does not send the scheduling information to the Node B 120. If, however, the new serving cell did not belong to the previous serving EDCH RLS, then the UE will send the scheduling information to the Node B 130. As a result, when the new serving cell belonged to the previous (i.e. before change in serving cell) serving EDCH RLS, scheduling information is not sent thereby avoiding unnecessary signaling.

The scheduling information may be carried, for example, in uplink medium access control (MAC) packet data units (PDU), such as the MAC-e PDU. According to an embodiment of the invention, the UE may include the scheduling information in the first MAC-e PDU it sends in uplink after the serving cell change is completed.

In the case of EDCH, there are two MAC sublayers, MAC-e and MAC-es. MAC-es sits on top of MAC-e and receives PDUs directly from MAC-d. MAC-es SDUs (i.e. MAC-d PDUs) of the same size and coming from a particular logical channel can be multiplexed together into a single MAC-es payload, to which the MAC-es header is prepended. The MAC-e header may include the number of PDUs and the data description indicator (DDI) value. The DDI field identifies the logical channel, the MAC-d flow and size of the MAC-d PDUs concatenated into the associated MAC-es PDU. If sufficient space is left in the EDCH transport block, or if scheduling information needs to be transmitted, an SI will be included at the end of the MAC-e PDU, as mentioned above.

Node B controlled scheduling is based on uplink and downlink control together with a set of rules regarding how the UE should behave with respect to this signaling. In the downlink, a resource indication (scheduling grant) is required to indicate to the UE the maximum amount of uplink resources it may use. When issuing scheduling grants, the Node B may use QoS-related information provided by the SRNC and from the UE in scheduling requests.

There are two types of grants: absolute grants and relative grants. Absolute grants provide an absolute limitation of the maximum amount of UL resources the UE may use. Relative grants increase or decrease the resource limitation compared to the previously used value. The UE can receive an absolute grant from the Serving EDCH cell and a relative grant from the serving EDCH RLS. Non-serving RLSs may only send relative grants to the UE.

In order for the UE to request resources from the Node Bs, scheduling requests may be transmitted in the form of Scheduling Information (SI) and a Happy Bit. The SI may be transmitted for the logical channels for which RRC configured that reporting needs to be made, while the Happy Bit may be transmitted on the EDCH dedicated physical control channel (EDPCCH). The happy bit is a single bit field that is passed from MAC to the physical layer for inclusion on the EDPCCH. The happy bit field may represent two values, "not happy" or "happy" indicating whether the UE could use more resources or not.

As mentioned above, FIG. 2 illustrates a system according to one embodiment of the invention. The system may include a network node or element 200 for informing a UE 210 that a serving cell change has occurred. In one example of the invention, this network element is RRC signaling 200. The UE 210, upon receiving the notification from the RRC signaling 200, determines whether the new serving cell belonged to a previous serving EDCH RLS. The sending of scheduling information, from the UE 210 to the Node B 220, is then triggered only if the new serving cell did not belong to the previous serving EDCH RLS.

Figure 3:
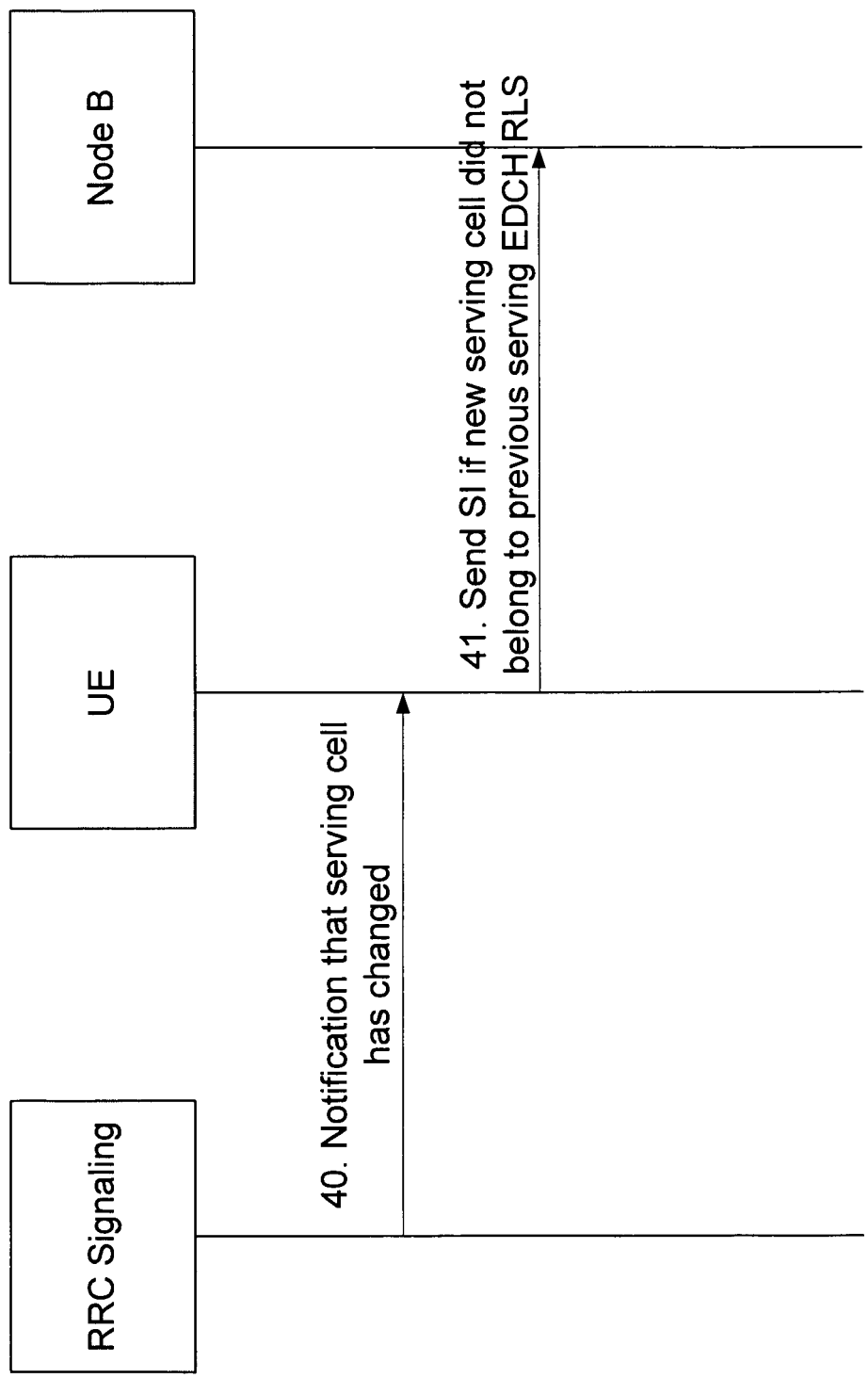
FIG. 3 illustrates a diagram of the messages sent according to one example of the invention.

FIG. 3 illustrates a diagram of the messages sent between the elements of the system. As discussed above, the RRC signaling 200 provides a notification, to the UE 210, that the serving cell has changed 40. The UE 210 then determines whether this new serving cell belonged to a previous serving EDCH RLS. If it did not, then a sending of the scheduling information to the Node B 220 is triggered 41. As a result, the scheduling information will only be sent to the Node B after a serving cell change if the Node B has also changed thereby avoiding unnecessary signaling.

As discussed above, the UE may include the following in the SI: logical channel ID of the highest priority channel with data in buffer, the logical channel ID field identifies the highest priority logical channel with available data and QoS information related to this indicated logical channel; UE buffer occupancy, which may include the buffer status for the highest priority logical channel with data in buffer as a fraction of the total reported buffer and the total buffer status; and an estimation of the available power ratio versus DPCCH. The SI may be located at the end of the MAC-e PDU and, as mentioned above, is used to provide the serving Node B with a better view of the amount of system resources needed by the UE and the amount of resources it can actually make use of.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:
1. A method comprising:
receiving an indication, at a user equipment, when a serving cell has changed to a new serving cell;
determining whether the new serving cell belonged to a previous serving radio link set; and
sending scheduling information when it is determined that the new serving cell did not belong to the previous serving radio link set,
wherein the sending comprises sending the scheduling information in a first medium access control protocol data unit in time of a plurality of medium access control protocol data units in uplink after completion of the serving cell change.

2. The method of claim 1, wherein the radio link set comprises an enhanced dedicated transport channel radio link set.

3. The method of claim 1, wherein the medium access control protocol data unit comprises a medium access control-e protocol data unit.

4. A system comprising:
  a user equipment;
  a base station; and
  a network node configured to inform the user equipment of a change in a serving cell;
  wherein the user equipment is configured to determine whether a new serving cell belonged to a previous serving radio link set,
  wherein the user equipment is further configured to send scheduling information to the base station when it is determined that the new serving cell did not belong to the previous serving radio link set,
  wherein the user equipment is further configured to send the scheduling information in a first medium access control protocol data unit in time of a plurality of medium access control protocol data units in uplink after completion of the serving cell change.

5. The system of claim 4, wherein the radio link set comprises an enhanced dedicated transport channel radio link set.

6. The system of claim 4, wherein the medium access control protocol data unit comprises a medium access control-e protocol data unit.

7. The system of claim 4, wherein the network node comprises radio resource control signaling.

8. A method comprising:
  receiving an indication, at a user equipment, when a serving cell has changed to a new serving cell; and
  sending, from the user equipment, scheduling information when the user equipment receives the indication that the serving cell has changed,
  wherein the sending comprises sending the scheduling information in a first medium access control protocol data unit in time of a plurality of medium access control protocol data units in uplink after completion of the serving cell change.

9. The method of claim 8, wherein the medium access control protocol data unit comprises a medium access control-e protocol data unit.

10. An apparatus comprising:
  a receiver configured to receive an indication when a serving cell has changed to a new serving cell;
  a processor configured to determine whether the new serving cell belonged to a previous serving radio link set; and
  a transmitter configured to send scheduling information to a base station when it is determined that the new serving cell did not belong to the previous serving radio link set,
  wherein the transmitter is further configured to send the scheduling information in a first medium access control protocol data unit in time of a plurality of medium access control protocol data units in uplink after completion of the serving cell change.

11. The apparatus of claim 10, wherein the radio link set comprises an enhanced dedicated transport channel radio link set.

12. The apparatus of claim 10, wherein the medium access control protocol data unit comprises a medium access control-e protocol data unit.

13. The apparatus of claim 10, wherein the apparatus comprises a user equipment.

14. An apparatus comprising:
  receiving means for receiving an indication when a serving cell has changed to a new serving cell;
  determining means for determining whether the new serving cell belonged to a previous serving radio link set; and
  transmitting means for transmitting scheduling information to a base station when it is determined that the new serving cell did not belong to the previous serving radio link set,
  wherein the transmitting means transmits the scheduling information in a first medium access control protocol data unit in time of a plurality of medium access control protocol data units.

* * * * *